(12) United States Patent
Zhi et al.

(10) Patent No.: US 11,437,644 B2
(45) Date of Patent: Sep. 6, 2022

(54) ENERGY STORAGE APPARATUS AND ELECTROLYTE FOR USE IN THE APPARATUS

(71) Applicant: City University of Hong Kong, Kowloon (HK)

(72) Inventors: Chunyi Zhi, Shatin (HK); Guojin Liang, Kowloon (HK); Funian Mo, Kowloon (HK); Zijie Tang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/707,044

(22) Filed: Dec. 9, 2019

(65) Prior Publication Data

US 2021/0175538 A1 Jun. 10, 2021

(51) Int. Cl.
*H01M 10/0562* (2010.01)
*H01M 4/24* (2006.01)
*H01M 10/32* (2006.01)
*H01M 4/38* (2006.01)
*H01M 4/134* (2010.01)

(52) U.S. Cl.
CPC ......... *H01M 10/0562* (2013.01); *H01M 4/24* (2013.01); *H01M 4/244* (2013.01); *H01M 4/38* (2013.01); *H01M 10/32* (2013.01); *H01M 4/134* (2013.01); *H01M 2300/0002* (2013.01); *Y02E 60/10* (2013.01)

(58) Field of Classification Search
CPC .. H01M 4/244; H01M 4/134; H01M 10/0562; H01M 2300/0002; H01M 10/32
See application file for complete search history.

(56) References Cited

U.S. PATENT DOCUMENTS

| | | | | |
|---|---|---|---|---|
| 3,669,743 A * | 6/1972 | Swindells | ............. | H01M 10/36 429/307 |
| 2007/0138027 A1* | 6/2007 | Dinsmoor | .......... | G01N 27/4035 205/787.5 |
| 2008/0187824 A1* | 8/2008 | Tomantschger | ...... | H01M 4/667 429/122 |
| 2012/0034515 A1* | 2/2012 | Kang | ..................... | H01M 4/50 429/188 |

(Continued)

FOREIGN PATENT DOCUMENTS

JP 58140971 A * 8/1983 .............. H01M 4/50

OTHER PUBLICATIONS

Machine Translation of JP58-140971A (Nov. 18, 2021) (Year: 2021).*

(Continued)

*Primary Examiner* — Matthew J Merkling
(74) *Attorney, Agent, or Firm* — Renner Kenner Greive Bobak Taylor & Weber

(57) ABSTRACT

An electrolyte for use in an energy storage apparatus includes: a metal halide-based electrolytic solution arranged to electrically connect a cathode and an anode of the energy storage apparatus during an operation of charging and discharging cycle. The electrolytic solution includes a first metal halide arranged to prevent a dissolution of the cathode and/or a formation of dendrites on the anode during the operation of charging and discharging cycle, thereby maintaining cyclic stability of the energy storage apparatus.

12 Claims, 16 Drawing Sheets

(56) References Cited

U.S. PATENT DOCUMENTS

| | | | | |
|---|---|---|---|---|
| 2013/0216901 A1* | 8/2013 | Ortega | ................... | H01M 4/34 |
| | | | | 429/206 |
| 2013/0236775 A1* | 9/2013 | Nunome | ............. | H01M 50/182 |
| | | | | 429/185 |
| 2014/0211370 A1* | 7/2014 | Seymour | ................ | H01G 9/025 |
| | | | | 361/504 |
| 2017/0338479 A1 | 11/2017 | Parker et al. | | |
| 2018/0130998 A1 | 5/2018 | Parker et al. | | |
| 2020/0194793 A1* | 6/2020 | Ozgit | ................... | H01M 10/24 |
| 2021/0336293 A1* | 10/2021 | Ji | ..................... | H01M 10/0563 |

OTHER PUBLICATIONS

Zamarayeva, A. M., et al, "Flexible and stretchable power sources for wearable electronics" Science advances 2017, 3 (6), e1602051.

Kumar, R., et al "All-Printed, Stretchable Zn—Ag2O Rechargeable Battery via, Hyperelastic Binder for Self-Powering Wearable Electronics." Advanced Energy Materials 2017, 7 (8), 1602096.

Li, C.; Zhang, Q.; Sun, J.; Li, T.; E, S.; Zhu, Z.; He, B.; Zhou, Z.; Li, Q.; Yao, Y., High-Performance Quasi-Solid-State Flexible Aqueous Rechargeable Ag—Zn Battery Based on Metal-Organic Framework Derived Ag Nanowires. ACS Energy Letters 2018, 3 (11), 2761-2768.

\* cited by examiner

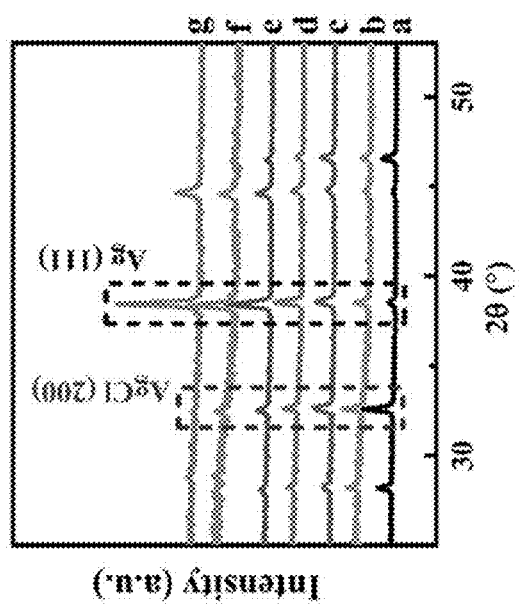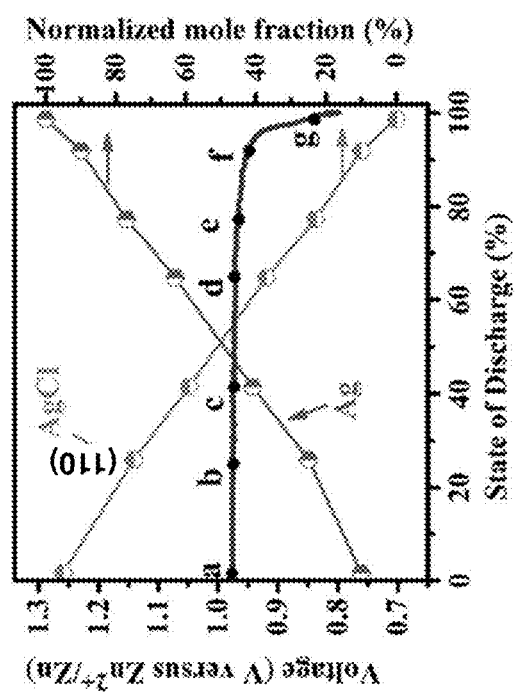
Fig. 12A
Fig. 12B

ENERGY STORAGE APPARATUS AND ELECTROLYTE FOR USE IN THE APPARATUS

TECHNICAL FIELD

The present invention relates to an electrolyte for use in an energy storage apparatus, in particular, but not exclusively, to a metal halide-based electrolyte that can maintain cyclic stability of the energy storage apparatus during an operation of charging and discharging cycle. The present invention also pertains to an energy storage apparatus including said electrolyte.

BACKGROUND

Alkaline batteries, particularly rechargeable alkaline batteries are attractive candidates for providing power as they usually provide high energy density under a predefined voltage. In general, the alkaline batteries may be applied to power different electronics (such as printed electronics, wearable electronics, etc.) as well as various vehicles. The electrochemical performance of the alkaline batteries may be governed by various aspects such as materials of the positive electrode (i.e. cathode) and the negative electrode (i.e. anode), constituents of the electrolyte, and/or any side reactions thereof.

Whilst alkaline batteries have long been a main choice of battery for different applications, current materials/electrolytes used in the alkaline batteries may generally suffer from side reactions within the alkaline batteries, leading to unsatisfactory battery performances.

SUMMARY OF THE INVENTION

In accordance with the first aspect of the present invention, there is provided an electrolyte for use in an energy storage apparatus, comprising: a metal halide-based electrolytic solution arranged to electrically connect a cathode and an anode of the energy storage apparatus during an operation of charging and discharging cycle; wherein the electrolytic solution includes a first metal halide arranged to prevent a dissolution of the cathode and/or a formation of dendrites on the anode during the operation of charging and discharging cycle, thereby maintaining cyclic stability of the energy storage apparatus.

In an embodiment of the first aspect, the first metal halide is arranged to interact with the cathode and/or the anode during the operation of charging cycle.

In an embodiment of the first aspect, halide ions of the first metal halide are inserted into a material structure of the cathode, causing the material structure of the cathode to undergo a phase transition.

In an embodiment of the first aspect, the halide ions form ionic bonds with the material structure of the cathode such that the material structure of the cathode forms a second metal halide during the phase transition.

In an embodiment of the first aspect, the second metal halide is substantially water-insoluble.

In an embodiment of the first aspect, the cathode includes silver.

In an embodiment of the first aspect, the second metal halide includes silver halide.

In an embodiment of the first aspect, the first metal halide includes zinc halide.

In an embodiment of the first aspect, the first metal halide includes at least one of zinc chloride, zinc bromide and zinc iodide.

In an embodiment of the first aspect, the halide ions of the first metal halide are inserted into a material structure of the anode, causing the material structure of the anode to form a third metal halide.

In an embodiment of the first aspect, the halide ions of the first metal halide form ionic bonds with the material structure of the anode so as to form the third metal halide.

In an embodiment of the first aspect, the formed third metal halide causes the material structure of the anode to have a porous structure with a smooth surface.

In an embodiment of the first aspect, the porous structure provides an increased surface area facilitating an anodic reaction during the operation of charging cycle.

In an embodiment of the first aspect, the anode includes zinc.

In an embodiment of the first aspect, the third metal halide includes zinc halide.

In accordance with the second aspect of the present invention, there is provided an energy storage apparatus, comprising: an anode and a cathode; an electrolyte comprising a metal halide-based electrolytic solution disposed between the anode and the cathode; wherein the electrolytic solution including a first metal halide arranged to prevent dissolution of the cathode and/or a formation of a dendritic structure on the anode during an operation of charging and discharging cycle, thereby maintaining cyclic stability of the energy storage apparatus.

In an embodiment of the second aspect, the cathode includes silver.

In an embodiment of the second aspect, the anode includes zinc.

In an embodiment of the second aspect, halide ions of the first metal halide are inserted into a material structure of the cathode, causing the material structure of the cathode undergoes a phase transition to form a second metal halide.

In an embodiment of the second aspect, the first metal halide includes at least one of zinc chloride, zinc bromide or zinc iodide.

In an embodiment of the second aspect, concentration of the first metal halide is 0.1 M to 1 M.

In an embodiment of the second aspect, the halide ions of the first metal halide are inserted into a material structure of the anode, causing a formation of a third metal halide.

In an embodiment of the second aspect, the apparatus is arranged to provide a substantially flat discharging voltage plateau at about 1 V caused by the phase transition, thereby providing a stable power output.

In an embodiment of the second aspect, the apparatus provides a cyclic lifetime of at least 1000 cycles.

In an embodiment of the second aspect, the apparatus is a rechargeable battery.

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 12A is a plot showing the XRD patterns of the Ag cathode at different discharging states.

FIG. 12B is a plot illustrating the relationship between Ag and AgCl at different discharging states. The points are in accordance with the relative peak intensity of FIG. 12A.

DETAILED DESCRIPTION OF THE PREFERRED EMBODIMENTS

Figure 1:
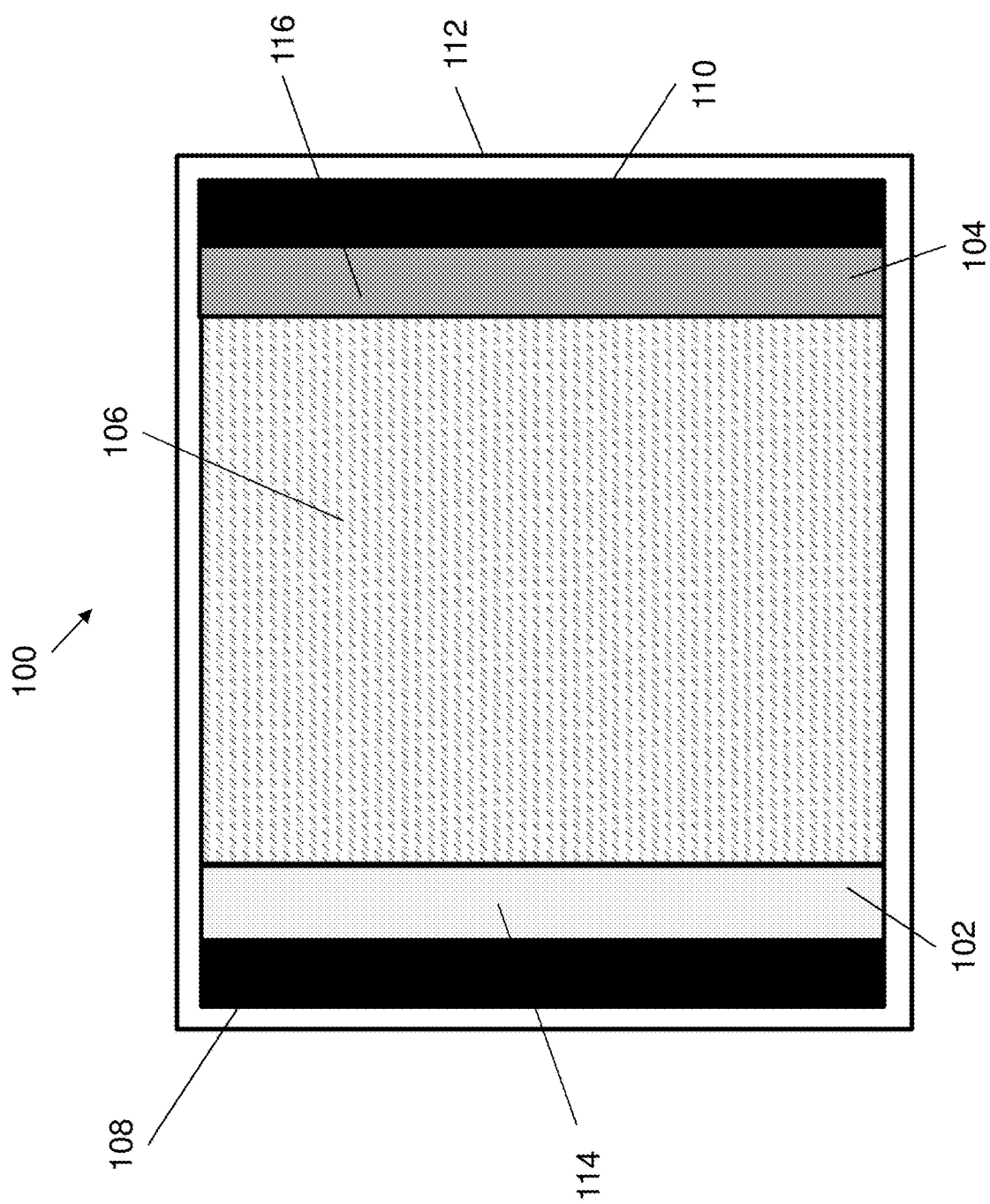
FIG. 1 illustrates an energy storage apparatus in accordance with an embodiment of the present invention.

Alkaline batteries are commonly used to power various electronics and vehicles owing to their high power density. In particular, they may possess one of the highest gravimetric and volumetric energy densities of commercially available batteries. In addition, they may possess low self-discharge rates as well as high current discharges upon demand.

Yet, the inventors have, through their own research, trials, and experiments, devised that many of the rechargeable alkaline batteries may suffer from a poor cyclic performance. The inventors devised that such poor cyclic performance may be correlated to the stability of the electrodes. For example, in silver-zinc alkaline batteries, on the one hand, the Zn anode may suffer from Zn dendrite growth during prolonged charging and discharging operation. Such dendritic structure may be fracture and disconnect from the anode, resulting in a capacity loss (in other words, the capacity retention is relative low). In addition, the dendritic structure may grow to an extent that may puncture the separator of the battery and may even make contact with the cathode, leading to a (internal) short circuit as a consequence.

On the other hand, the Ag cathode may suffer from dissolution during the charging process. In particular, the cathode may form soluble oxide species during the charging process and therefore resulting in a loss of cathode material during the charging process and degradation of the battery capacity.

It is appreciated one straightforward approach to overcome the aforesaid issues (one by one or simultaneously) may be replacing or modifying the electrode materials. However, the inventors have, through their own research, trials, and experiments, devised that electrolyte, particularly the electrolyte with halide ions may be applied to enhance the stability of the electrodes, thereby maintaining the cyclic performance of the battery during an operation of charging and discharging cycle.

In accordance with an example embodiment of the present invention, there is provided an energy storage apparatus with a high capacity retention and prolonged cycling performance. The apparatus may have a capacity retention of at least 93% and cycling performance of at least 1000 cycles. The apparatus may include a pair of electrodes and an electrolyte containing a metal-halide based electrolytic solution. Preferably, the metal halide of the electrolytic solution may interact with the electrodes during an operation of charging and discharging cycle so as to maintain the cyclic stability of the apparatus.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

With reference to FIG. 1, there is shown an exemplary embodiment of an energy storage apparatus 100. The energy storage apparatus 100 may be of any form that can capture energy produced at one time for use at a later time. In this example, the energy storage apparatus is a battery, in particular a rechargeable battery. The battery 100 may be of any suitable form that fits a particular application, such as flat-shaped, fiber-shaped, twisted fiber-shaped, coin-shaped, ball-shaped etc. Regardless of the shape of the battery, the battery may substantially have a stable power output and long lasting cycling performance.

In this embodiment, the battery 100 comprises an electrode 102 and an electrode 104 being spaced apart from each other and an electrolyte 106 disposed between the electrodes 102, 104. The electrolyte 106 is sandwiched between and is electrically coupled with the electrodes 102, 104. The electrodes 102, 104 may function as an anode and a cathode, respectively or vice versa.

Optionally or additionally, the battery 100 may also include substrates 108, 110 which may provide mechanical supports to the electrode 102 and/or the electrode 104. The substrates may also operate as a current collector to associate with the electrodes 102, 104, respectively. For example, the substrates may be electrically conductive and may be bonded to external electrical wires to deliver electrical energy to an external electronic apparatus.

The battery 100 may optionally include an encapsulation 112 that receives and encases the electrodes 102, 104 and the electrolyte 106. The encapsulation 112 may be formed in any suitable shape such as for example a cylinder or a planar shape or any other suitable shape. The encapsulation 112 may be formed from a suitable material such as epoxy or a polymer, particularly a polymer with a certain extent of flexibility.

In one example embodiment, the electrode 102 functions as an anode and the electrode 104 functions as a cathode of the battery 100. In operation there is a charge transfer between the anode 102 and the cathode 104 in order to convert chemical energy to electrical energy. The anode 102 and the cathode 104 may be flexible such that they may be arranged in a suitable arrangement easily depending on the desired shape of the battery 100.

With reference to FIG. 1, the anode 102 may comprise a substrate 108 with a metal or metal compound 114 disposed on the substrate 108. The substrate 108 may be of any suitable material. In one example, the substrate 108 may have the same material as the metal or metal compound 114. That is, the anode 102 does not include an additional substrate 108 and may include a piece of metal or metal compound. In this example, the anode may be a piece of zinc metal. The zinc metal may be a flexible ribbon or a flexible sheet of zinc metal. The zinc metal is arranged in a suitable configuration based on the desired shape of the battery 100.

Alternatively, the substrate 108 may be selected from materials with some electrical conductance but is preferably robust enough to function within an electrolyte. For example, the substrate 108 may be selected from carbon cloth, carbon nanotube (CNT) paper, carbon paper, nickel/copper alloy cloth, steel sheet and the like.

The anode 102 preferably comprises zinc. In one example, the anode may be a zinc sheet or a piece of zinc metal. That is, the anode 102 may not include an additional substrate 108 and may include a piece of zinc sheet/metal only. The zinc sheet/metal may have a predetermined thickness or dimension depending on the operational life of the battery 100 according to one's needs.

In another example, the anode may be a zinc nanosheet 114 that is electrodeposited onto the substrate 108. The substrate 108 may provide a base layer for the zinc to be deposited onto. The substrate 108 may also have a rough surface with intertwined structures which may in turn facilitate the deposition of materials thereon. The zinc may be deposited to form a substantially thick layer of zinc 114. The thickness may depend on the operational life of the battery 100 according to one's needs.

The cathode 104 may have a similar configuration as the anode 102. That is, the cathode 104 may have a metal or a metal compound 116 alone or may have a metal or a metal compound 116 deposited on a substrate 110, which may be selected from carbon cloth, carbon nanotube (CNT) paper, carbon paper, nickel/copper alloy cloth, steel sheet and the like. The cathode 104 preferably comprises silver. In one example, the cathode may be a silver wire or a piece of silver metal. That is, the cathode 104 may not include an additional substrate 110 and may include a silver wire/a piece of silver metal only. Preferably, the cathode 104 may be a silver nanowire with a predetermined thickness or dimension depending on the operational life of the battery 100 according to one's needs. In one example, the silver nanowire 104 may have a diameter of about 20 nm and a length of 50 μm.

Alternatively, the cathode 104 may comprise silver particles, particularly silver nanoparticles deposited on the substrate 110. The silver nanoparticles may be deposited on the substrate to form a layer of silver. It is appreciated that the thickness of the layer of silver nanoparticles may vary in accordance with the operational life of the battery 100 of one's needs.

The electrolyte 106 may be an electrolytic solution being disposed/contained the encapsulation 112 and the anode 102 and the cathode 104 are positioned within the electrolyte. In particular, the electrolyte solution may be a solution that is capable of dissolving a predetermined amount of a metal halide therein. In one example, the electrolytic solution may be an aqueous electrolytic solution including a first metal halide. The first metal halide may be a metal halide that is compatible with the anode and cathode operation. In one example, the first metal halide may be a zinc halide with a concentration of about 0.1 M to 1 M. Preferably, the zinc halide may include at least one of zinc chloride, zinc bromide, and zinc iodide. Advantageously, the first metal halide(s) may be arranged to prevent any undesirable chemical transformation of the anode and cathode during the operation of charging and discharging cycle thereby maintaining the cyclic stability of the battery. For example, the first metal halide may be arranged to prevent dissolution of the cathode and/or a formation of dendrites on the anode during the operation of the charging and discharging cycle.

It is appreciated that in the operation of charging and discharging cycle, the anode 102/metal 114 and the cathode 104/metal 116 may respectively undergo a series of chemical reactions to convert chemical energy into electrical energy or convert vice versa during the discharging and charging processes. During the discharging process, the cathode may undergo a reduction reaction(s) by gaining electron(s) at the expense of the anode. Meanwhile, the anode may be stripped through an oxidation reaction(s) to provide an electron(s) to the cathode, and therefore there is a current flow within the battery. In contrast, during the charging process, the cathode may undergo an oxidation reaction(s) to store charges from an external source whereas the anode may be restored through a reduction reaction(s) of which the stripped anode material may be deposited back to the anode.

However, as the charging and discharging cycle is a prolonged repeated process, it may be unavoidable for some undesirable reaction(s)/transformation(s) to occur. For example, during the charging process, on the one hand, the cathode may form an oxide species that is soluble in the electrolyte irrespective of whether there is or is not an electrochemical reaction being carried out. Thus, the cathode may be gradually dissolved in the electrolyte, rendering a gradual or even a sharp reduction of cyclic performance of the battery.

On the other hand, the repeated stripping-deposition reactions at the anode may lead to a rough surface thereon. As such, a positively sloped concentration gradient may be established as a function of distance from the anode surface. Any stripped anode material may therefore be deposited preferentially at raised surface heterogeneities, such as screw dislocations (which are higher up the concentration gradient), giving rise to dendritic structures. The dendritic structures may be fracture and disconnect from the anode, resulting in a capacity loss of the battery (in other words, the capacity retention is relative low). In addition, the dendritic structures may grow to an extent that may puncture the separator of the battery and may even make contact with the cathode, leading to a (internal) short circuit as a consequence.

The first metal halide of the electrolyte 106 may be useful in overcoming the aforementioned issues. For example, the first metal halide may be arranged to interact with the electrodes during the cyclic operation. Particularly the first metal halide may be inserted into a material structure of the electrodes, causing a phase transition and/or structural change of the electrode material, thereby preventing said dissolution and dendrites formation.

Figure 2:
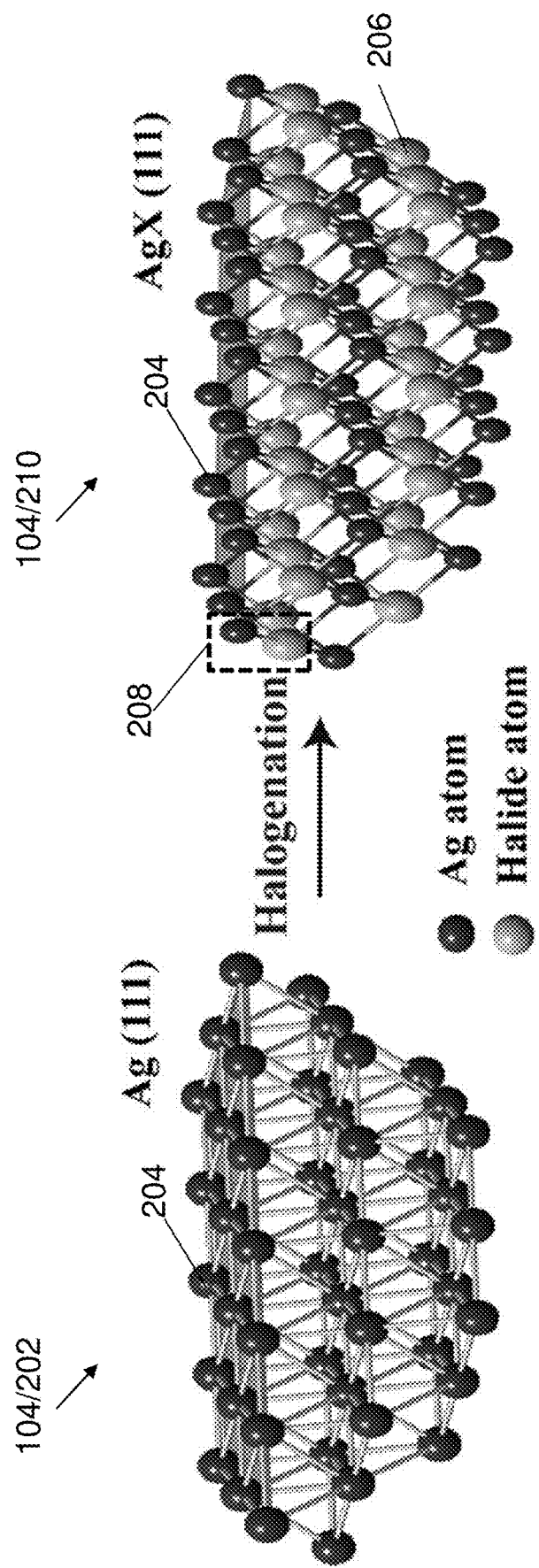
FIG. 2 is a schematic diagram illustrating the insertion of halide ion into a cathode of the energy storage apparatus of FIG. 1 during a charging process.

With reference to FIG. 2, there is shown an exemplary example of a material structure 202 of the cathode 104. The material structure 202 may include a plurality of metal atoms 204, such as silver, thallium, lead, etc. arranged in a predefined three dimensional space forming a crystal structure. The crystal structure may be of any crystal structures known in the art, such as orthorhombic, tetragonal, hexagonal, cubic, and the like. During the charging process, the halide ions 206 of the first metal halide may act as a negative charge carrier to deliver charges to the cathode 104. The halide ions 206 may be inserted into the material structure 202 and accommodated in the spacing defined by adjacent metal atoms 204. Upon the accommodation, the halide ions 206 may react with the metal atoms 204 and form a second metal halide 208 through a formation of an ionic bond with the metal atoms 204. In other words, the cathode 104 may undergo a phase transition from the material structure 202 to a material structure 210, which includes the second metal halide. In particular, the second metal halide 208 is of minimum solubility in water. Preferably, the second metal halide 208 is water-insoluble. In this way, the cathode 104 does not include any water-soluble species and therefore the cathode is prevented from dissolution during the charging process.

When the battery is configured to discharge, the halide ions 206 may be extracted from the water-insoluble material structure 210 into the electrolyte 106, restoring the halide ion concentration in the electrolyte. In sum, the dissolution of the cathode during charging may be prevented through the reaction between the cathode and the first metal halide, which can be expressed as $M+nX^- \rightleftharpoons MX_n+ne^-$ (where M is metal of the cathode; X is halide; $n \geq 1$).

In one example, the material structure 202 may include a plurality of silver atoms 204 arranged in a cubic manner, forming a crystal structure of, for instance, a face-centered cubic (FCC) structure. As mentioned, the halide ions 206 may act as a negative charge carrier during the charging process and may be inserted into as well as accommodating in the material structure 202. In this example, the halide ions 206 may be chloride ions. The chloride ions 206 may be accommodated in the spacing defined by adjacent silver atoms 204 after the insertion. The chloride ions may form an ionic bond with the silver atoms thereby forming a water-insoluble silver chloride compound 208. As such, the silver material structure 202 has undergone a phase transition to a water-insoluble silver chloride material structure 210. In this way, the cathode 104 may now become water-insoluble during the charging process and/or when the battery is configured to be idle after the charging process.

The inventors have devised that the phase transition between the material structure 202 and the material structure 210 may be a substantially complete process. That is, the conversion between the metal 204 to the metal halide 208 does not lead to a formation of any intermediate species (e.g. side products, impurities, etc.). Such a "clean" transition/conversion may be advantageous to the electrochemical performance of the battery. For example, the discharging voltage plateau of the battery may be within 2% deviation difference, providing a substantially flat discharge plateau at an operational voltage. As such, a stable power output from the battery may be obtained.

As mentioned, the anode 102 may undergo a repeated stripping-deposition process during the operation of charging and discharging cycles. The repeated stripping-deposition reactions at the anode may lead to a rough surface thereon, leading to the formation of dendritic structures and/or facilitating the formation of subsequent dendrites, which may render a capacity loss of the battery and/or a short circuit.

Figure 3:
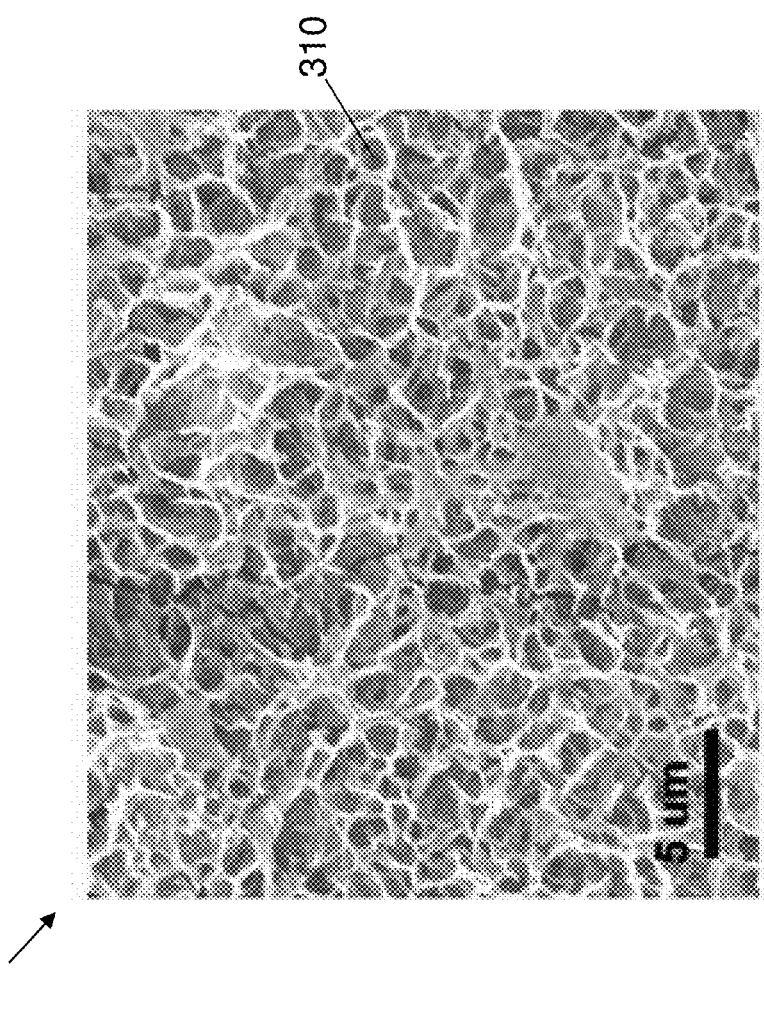
FIG. 3 is a SEM image of an anode of the energy storage apparatus of FIG. 1 during an operation of charging and discharging cycle.

In addition to taking effect on the cathode, the inventors have devised that the first metal halide may be further arranged to suppress the formation dendritic structures on the anode, thereby preventing the battery from internal short circuit. With reference to FIG. 3, there is provided an exemplary example of a material structure 302 of anode 102. During the charging process, the halide ions 206 may be inserted into the material structure 302 accompanying with deposition of the stripped anode material. For example, the halide ions 206 may be inserted into a zinc material structure 302 when the stripped Zn (in form of zinc ion) is deposited back to anode 102 (in form of zinc metal). The halide ions may form an ionic bond with the metal atoms 304, which construct the material structure 302, so as to accommodate themselves in the material structure 302 or to be retained by the material structure 302 in other words. In this way, the material structure 302 may include a third metal halide 306 therein, which may cause a structural change of the material structure 302.

For example, as shown in FIG. 3, the material structure 302 may form a highly porous structure 308 with a smooth surface upon the insertion of the halide ions as well as the formation of the third metal halide 306. The porous structure 308 may include a plurality of voids 310 which may facilitate the formation of metal atoms 304 during the charging process. In particular, the presence of the plurality of voids 310 may increase the surface area of the anode, providing more "contact points" for the stripped anode material to accept electron(s) and to convert to metal atoms 303. In other words, the deposited metal atoms may be more evenly distributed within the material structure 302 rather than being concentrated on the surface thereof, causing the formation of the smooth anode surface. Thus, the formation of the third metal halide 306 from the reaction of the metal atoms 304 and the inserted halide ions 206 may prevent the aforementioned positively sloped concentration gradient establishment as a function of distance from the anode surface, thereby suppressing the formation of dendritic structures.

Referring to FIG. 3, there is shown an example of a zinc material structure 302 of the anode 102. During the charging process, the halide ions, such as chloride ions 206 may be inserted into the zinc material structure 302 accompanying with the deposition of the stripped anode material (i.e. conversion of zinc ion to zinc metal). The chloride ions may react with the zinc atom 303 of the material structure 302 to form a zinc chloride 306 through the formation of an ionic bond. As such, the zinc material structure may include the zinc chloride therein. The presence of the zinc chloride 306 may render the zinc material structure highly porous and having a smooth surface.

The highly porous structure 308 may include a plurality of voids 310 which may facilitate the formation of zinc atoms 304 during the charging process. In particular, the presence of the plurality of voids 310 may increase the surface area of the zinc anode 102, providing more "contact points" for the stripped anode material (in the form of zinc ions) to accept electron(s) and to convert to zinc atoms 303. As such, the zinc atoms 303 may be deposited more evenly within the material structure 302 rather than being concentrated on the surface thereof, causing the formation of the smooth anode surface, preventing the aforementioned positively sloped concentration gradient being developed as a function of distance from the anode surface, thereby suppressing the formation of dendritic structures.

The energy storage apparatus of the present disclosure such as the battery 100 may be fabricated by commencing at the step of fabricating the electrodes. It may be first by forming or providing an anode including zinc. In one example, the anode may be a zinc anode in a form of zinc sheet, zinc block, and the like. Alternatively, the anode may be formed by electrodepositing zinc metal onto a substrate such as carbon cloth, carbon nanotube (CNT) paper, carbon paper, nickel/copper alloy cloth, steel sheet and the like. The electrodeposition time may depend on the thickness requirement, which may depend on the operational life of the battery. The electrodeposition may be carried out by reported methods such as a facile electrochemical deposition performed with a two-electrode setup.

After obtaining the zinc anode, the fabrication process may proceed to providing a cathode. In one example, the cathode may be a cathode in a form of silver sheet, silver block and the like. In another example, the cathode may be a silver nanowire. The silver nanowire may be prepared by reported physical or chemical methods such as mechanical pulverization, template method, polyol method, photoreduction method, and solvothermal method. In yet another example, the cathode may be silver nanoparticles being electrodeposited on a substrate such as carbon cloth, CNT paper, carbon paper, nickel/copper alloy cloth, steel sheet and the like. The electrodeposition may be carried out in a similar manner as the anode.

It is appreciated that the steps of forming the anode and the cathode may be reversed (i.e. forming the cathode prior to forming the anode) or may be performed simultaneously.

The electrolyte may then be prepared by dissolving a metal halide in water. In one example, the metal halide may be zinc chloride. The electrolyte may be prepared by dissolving a predetermined amount of zinc chloride in water, forming a zinc chloride solution with, for example, a concentration of 0.1 to 1 M (i.e. an aqueous electrolytic solution containing 0.1 to 1 M of zinc chloride).

Finally, the battery 100 may be assembled in an open air environment. In one example, the battery may be a coin cell. The cell may be assembled by disposing the aforementioned anode (e.g. zinc anode) and cathode (e.g. silver cathode) within an aqueous electrolytic solution (e.g. 0.1 M $ZnCl_2$), using a non-woven filer paper as a separator.

The characterization and performance of embodiments of the electrolyte and the energy storage apparatus containing the electrolyte will now be discussed.

Figure 4:
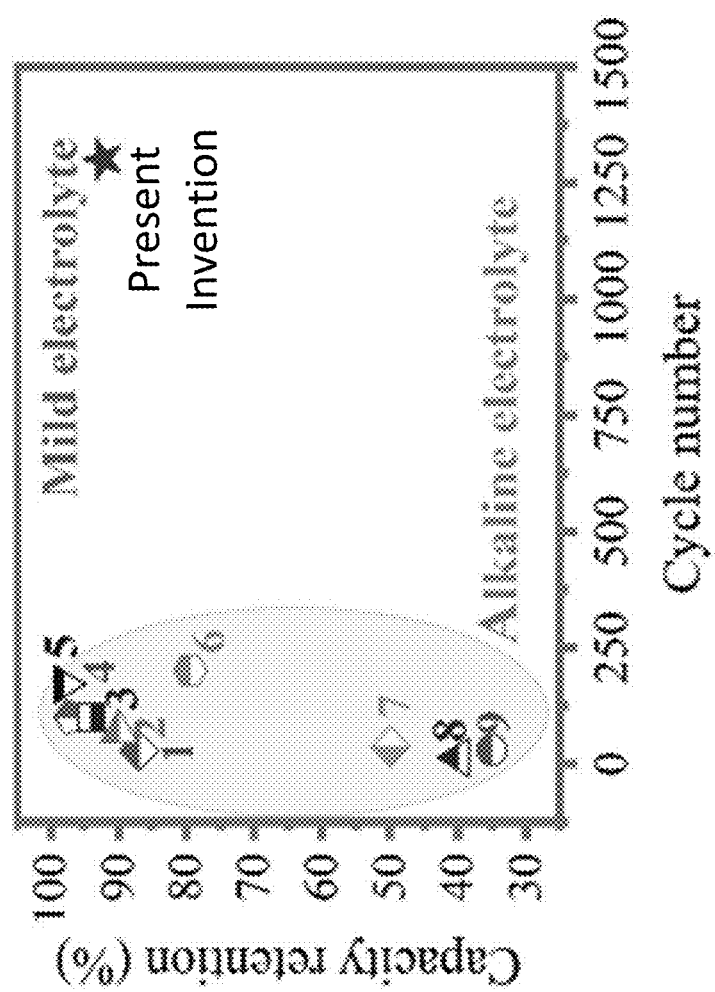
FIG. 4 is a plot of capacity retention against cycle number of reported alkaline silver-zinc (Ag—Zn) batteries and the mild silver-zinc battery in accordance with an example embodiment of the present invention.

The energy storage apparatus 100, such as a silver-zinc battery containing a metal halide-based electrolyte may have a superior cyclic stability over the reported silver-zinc (Ag—Zn) batteries with an alkaline electrolyte. As shown in FIG. 4, the inventors have devised that many of the reported silver-zinc batteries may have a cycling life-span of at most 200 cycles, irrespective of how pronounced the capacity retention they have. In sharp contrast, the Ag—Zn battery of the present invention could offer a superior cyclic stability with 1300 cycles.

Such an outstanding cyclic stability of the Ag—Zn battery 100 may be as a result of the mild electrolyte containing a metal halide, which takes effect on the silver cathode and/or the zinc anode. To investigate the effect of the metal halide on cathode, a Ag—Zn coin cell containing an alkaline electrolyte was fabricated. The alkaline Ag—Zn battery was prepared with an electrolysis configured cell in order to minimize any potential Zn dendrite issues in the battery. Thus, the battery performance measured would be dominantly reflected by the Ag cathode. Meanwhile, a Ag—Zn battery containing a mild electrolyte with 0.1 M $ZnCl_2$ is fabricated for comparison.

Figure 5B:
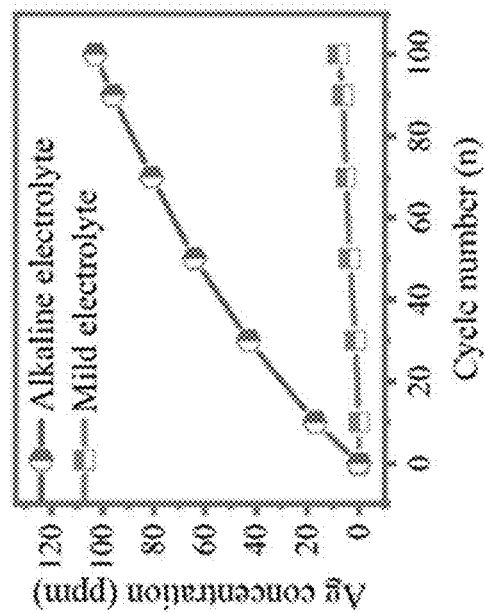
FIG. 5B is a plot of Ag concentration against cycle number of the alkaline Ag—Zn battery and the mild Ag—Zn battery upon subjecting to 100 cycles of cycling operation.
Figure 5A:
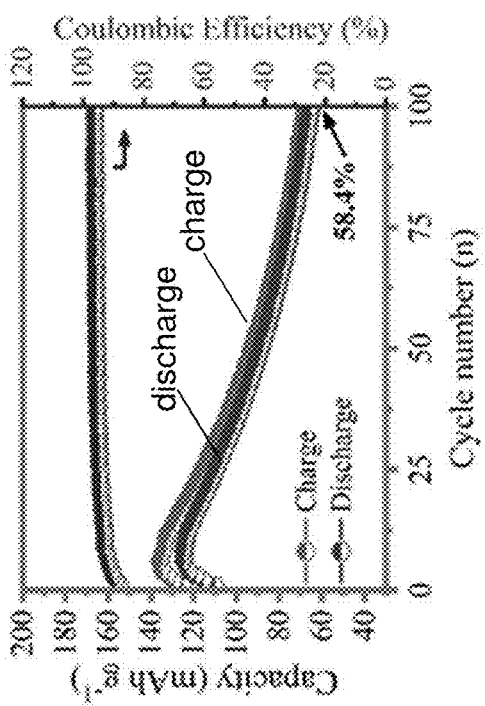
FIG. 5A is a plot of capacity against cycle number showing the cyclic performance of an alkaline Ag—Zn battery at 1 A g$^{-1}$.
Figure 5C:
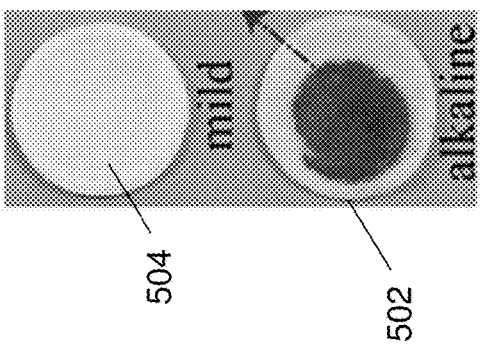
FIG. 5C is an optical image showing the respective appearance of separators of the alkaline Ag—Zn battery and the mild Ag—Zn battery after subjecting 100 charging cycles.
Figure 5D:
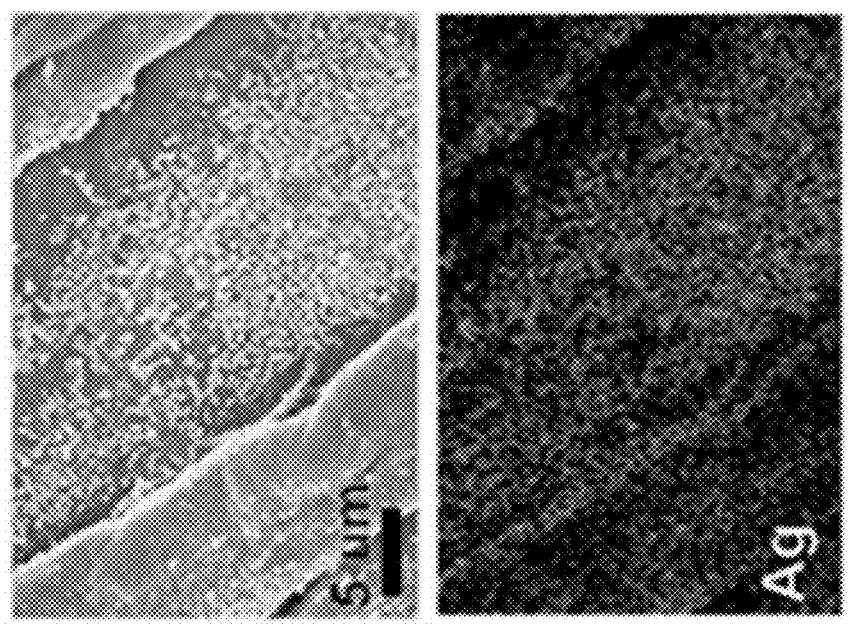
FIG. 5D is a SEM image of the particles on the separator of the alkaline Ag—Zn battery of FIG. 5C, and the corresponding SAED image showing the element of the particles.

As shown in FIGS. 5A and 5B, the capacity of the alkaline Ag—Zn battery degraded to 58.4% after 100 cycles and the Ag ions concentration in the electrolyte was gradually increased to 138 ppm after 100 cycles, which verified the dissolution of Ag cathode into the alkaline electrolyte during the operation of charging and discharging cycles. In sharp contrast, the Ag concentration in the mild electrolyte of the Ag—Zn battery 100 was determined to be 8 ppm after 100 cycles of charging and discharging operation (FIG. 5B). The dissolution of Ag cathode in the alkaline electrolyte was further supported by the appearance of the separator. As shown in FIG. 5C, the separator of the alkaline battery (502) was deposited with a plurality of dark particles after subjecting to a first charging cycle. Characterization of the dark particles by scanning electron microscopy (SEM) and selected area electron diffraction (SAED) determined that those particles include a large amount of silver elements. In sharp contrast, the separator of the Ag—Zn battery 100 (504) is apparently free from particle deposition after subjecting to 100 charging cycles (FIG. 5D). All these results suggest that the presence of the metal halide such as $ZnCl_2$ may prevent Ag cathode from dissolution during the charging process.

Figure 6:
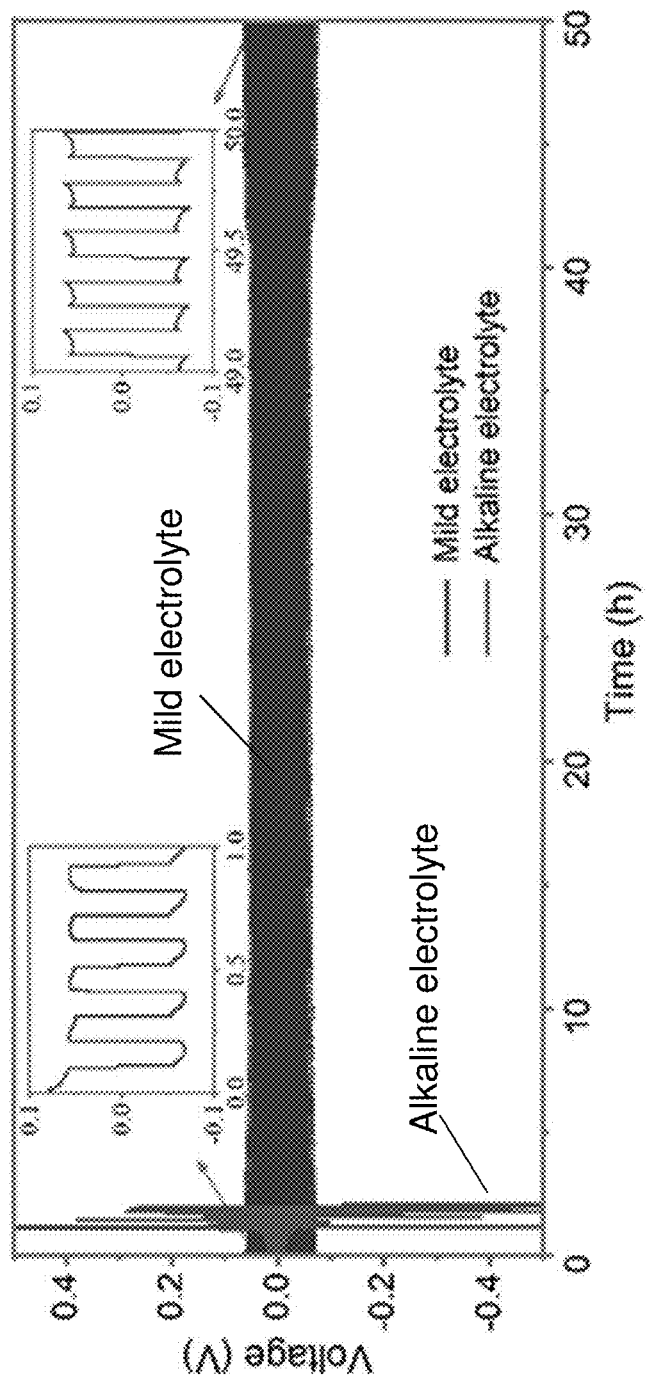
FIG. 6 is a plot of voltage against time showing the cyclic stability of Zn anodes in the alkaline and mild electrolytes. The inserts are the enlarged regions of selected timeframes.

The effect of the metal halide on the Zn anode was next investigated with a symmetrically configured battery containing the alkaline electrolyte and the mild electrolyte, respectively. As shown in FIG. 6, under an identical areal current density and capacity, short circuit occurs when the alkaline battery is subjected to only 4 cyclic operations (less than one hour) while the mild battery delivered a stable voltage for at least 250 cycles (50 hours) prior to having short circuit.

In light of these results, the morphologies of the Zn anode in the mild and the alkaline electrolytes were respectively analyzed. The morphology of the Zn anode operated in the alkaline electrolyte was found to be having a plurality of irregularly shaped structures, with those needle-like crystalline being Zn dendrites. On the contrary, the Zn anode operated in the mild electrolyte (i.e. the electrolyte containing $ZnCl_2$) was found to be substantially smooth with a large amount of voids (FIG. 3). Given that the zinc anode operated in other mild electrolytes (e.g. $ZnSO_4$) may give a sheet-like morphology rather than a highly porous one, the morphology as shown in FIG. 3 may be a consequence of the existence of chloride ion in the zinc anode during the charging cycle. In other words, the chloride ion may be inserted into the Zn anode during the charging process, causing a structural change of the Zn anode.

Other than preventing short circuit by suppressing Zn dendritic growth, the highly porous morphology of the Zn anode may also be advantageous electrochemical stability. For example, as shown in the inserts of FIG. 6, it is verified that the polarized potentials of Zn deposition and dissolution operated in mild electrolyte stays almost identical throughout the cycling, whereas a fluctuation was observed when the Zn deposition and dissolution was operated in alkaline electrolyte. All these results suggest the stability of electrochemical performance of Zn anode in the mild electrolyte during long cycling.

In sum, the metal halide in the electrolyte could simultaneously suppress dissolution of Ag cathode and dendrite growth on Zn anode.

Figure 7A:
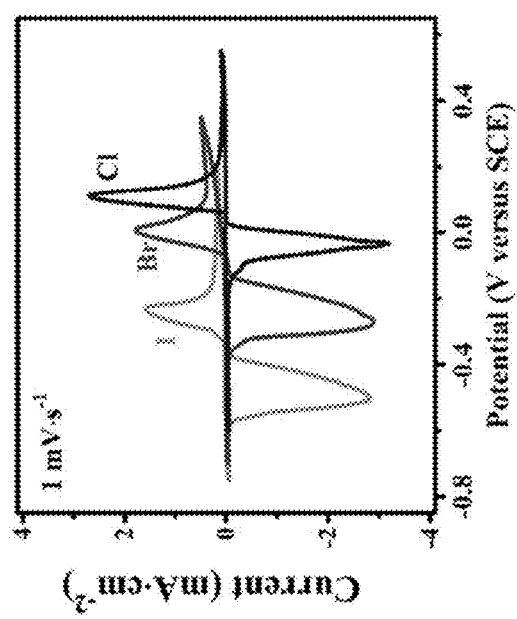
FIG. 7A is a cyclic voltammogram showing the CV curves of a Ag electrode upon subjecting to anodic and cathodic scan in different halide-containing electrolytes.

The reaction mechanism of the Ag cathode with the halide ions ($Cl^-$, $Br^-$, $I^-$) was further examined by cyclic voltammetry (CV) technique performed in a three-electrode system. As shown in FIG. 7A, the conversion efficiency of $Cl^-$, $Br^-$, $I^-$-containing electrolyte were found to be 99.4%, 95.6%, and 93.2%, respectively. By evaluating the amount of anodic and cathodic charges (0.24 C $cm^{-2}$), in particular, the CV curves of the $Cl^-$-containing electrolyte was in a symmetric shape, suggesting that both the charged and discharged products of the cathode are completely reversible transition without other concurrently parasitic reactions.

Figure 7B:
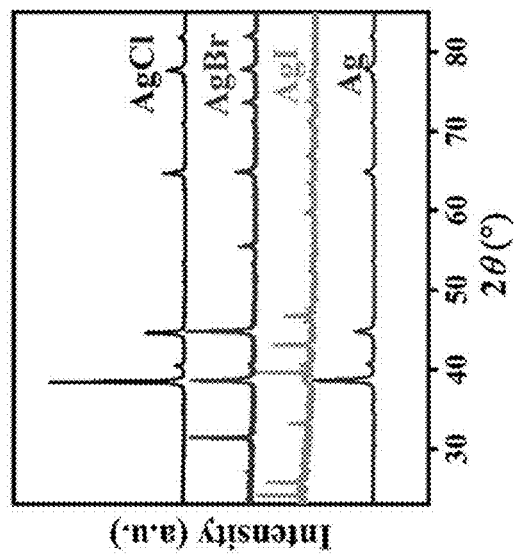
FIG. 7B is a plot showing the XRD patterns of the Ag electrode after subjecting to the anodic scan in different halide-containing electrolytes.

X-ray diffraction (XRD) patterns of initial Ag state and oxidized states assigned to Ag halides are shown in FIG. 7B. Notably, Ag oxides, which would be produced in alkaline electrolyte, are not found in the XRD analysis. It implies that the oxidation of Ag cathode during the charging process now is completely replaced by the reaction mechanism of producing insoluble Ag halides in the mild electrolyte, instead of producing the soluble Ag oxides in the alkaline electrolyte. In general, the formation of Ag halides may be expressed by the equation of $Ag+X^- \rightleftharpoons AgX+e^-$, where $X^-$ is $Cl^-$, $Br^-$ or $I^-$, and it is a first-order phase transition proceeds between Ag and AgX upon halide insertion-extraction, as illustrated in FIG. 2.

In view of the comparatively better conversion performance of $ZnCl_2$, the mild $ZnCl_2$ electrolyte was selected as an example to investigate the reaction mechanism and battery performance further. Silver nanowires (AgNWs) were prepared and utilized as the cathode for the structural evolution characterization during the charging process. The AgNW used herein may have an initial diameter and length of 20 nm and 50 μm, respectively. The structural evolution was analyzed by transmission electron microscopy (TEM) and scanning electron microscopy (SEM).

Figure 8B:
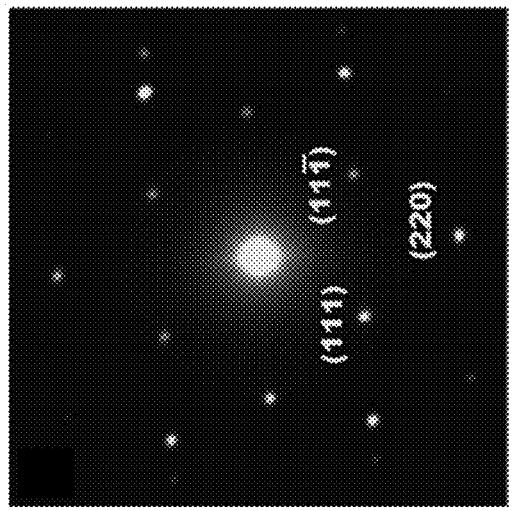
FIG. 8B is a SAED image of the AgNW of FIG. 8A.
Figure 8C:
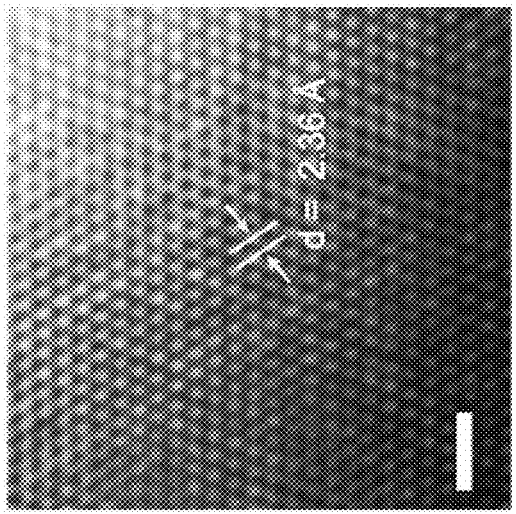
FIG. 8C is a HRTEM image of the AgNW of FIG. 8A with a scale of 1 nm.
Figure 8A:
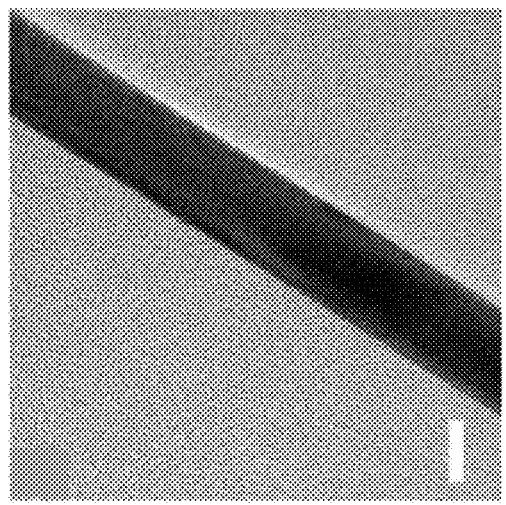
FIG. 8A is a TEM image of a silver nanowire (AgNW) with a scale of 20 nm.
Figure 9B:
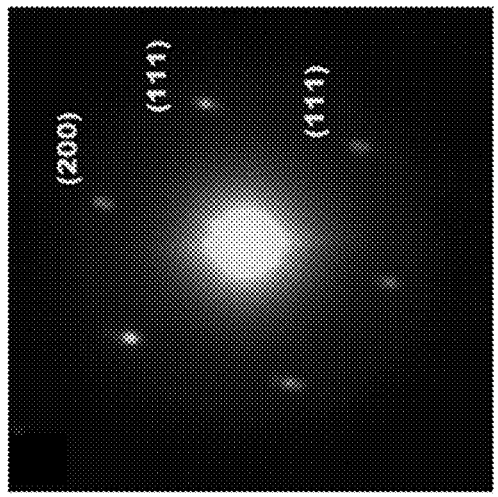
FIG. 9B is a SAED image of the AgCl of FIG. 9A.
Figure 9C:
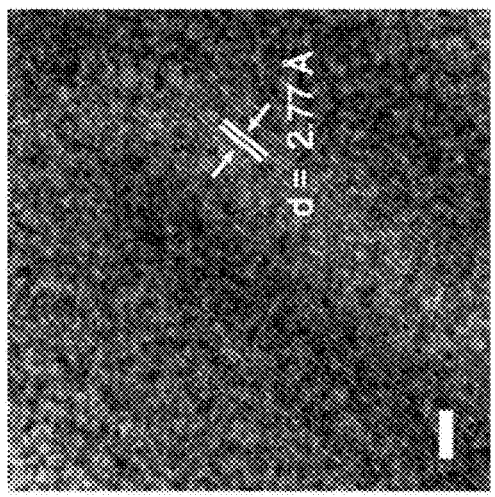
FIG. 9C is a HRTEM image of the AgCl of FIG. 9A with a scale of 2 nm.
Figure 9A:
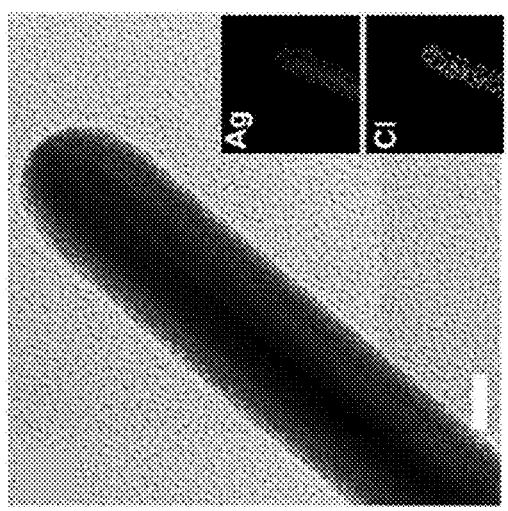
FIG. 9A is a TEM image of silver chloride (AgCl) with a scale of 10 nm.

Selected area electron diffraction (SAED) pattern exhibited a superimposed diffraction spots viewed along <110> axis, ascribing to the twin boundary of AgNWs with the bicrystalline structure (FIG. 8B). High-resolution TEM studies revealed obvious lattice fringes with 60° intersection angle corresponding to the Ag (111) plane of face-centered cubic (FCC) structure (FIG. 8C). After proceeding phase transition to AgCl, the wire-shaped morphology was maintained (as compared with FIG. 8A), where the corresponding mapping unveils the coexistence of silver and chlorine elements (FIG. 9A and the inset thereof). Additionally, in accordance with the mapping results, the SAED unveiled (111) and (200) planes of AgCl and HRTEM analysis revealed obvious lattice fringes corresponding to (111) planes of FCC AgCl (FIGS. 9B and 9C).

The electrochemical behaviours of the mild Ag—Zn battery were investigated by assembling the AgNWs cathode with the Zn anode. In particular, the deposition-dissolution behavior of the Zn anode and the chloride insertion-extraction behavior of the AgNWs cathode are respectively illustrated in FIG. 10. It is appreciated that it is of much interest on the ultra-flat discharging voltage plateau, which is a long-term pursuit for stable battery performance. The origin of specific shapes for discharging voltage plateau will now be investigated and discussed.

It is appreciated that in order to obtain a flat discharge platform, it is necessary to maintain the potential difference between the cathode and the anode during the discharge proceeding. It is also appreciated that when the battery reaction equation is determined, the Gibson formation energy of the products and reactants of the reaction do not vary as the reaction progresses. Thus, regarding the battery chemistry with insertion-extraction or conversion behavior, it is of paramount importance to adopt a "clean" two-phase reaction (i.e. there is no solid-solution formation or intermediate phases of electrode materials during the cycling process, which are considered in correlation with the gradual elevation of potentials and the non-Nernst type curve).

For example, in an aprotic battery, $FePO_4$ is converted to $LiFePO_4$ during the discharging process with only two phases involved, exhibiting a flat voltage plateau at 3.5 V. However, in aqueous batteries, it is common that the discharging profile is sloped due to the common solid-solution mechanism of cathode materials, which undergo concurrent insertion/extraction behaviors, conversion reactions or continuous phase transition reactions. For example, the sub-regions of the discharge curves of $MnO_2$—Zn battery is determined with separated co-insertion and conversion behaviors, where the two sloping plateau regions respectively correlated to $H^+/Zn^{2+}$ insertion kinetics with subsequent formation of $ZnSO_4[Zn(OH)_2]_3 \cdot xH_2O$. On the other hand, in the representative $V_2O_5$ based cathode materials, the reaction mechanisms is verified with insertion of different cations, where the products are nonstoichiometric phase $M_xV_2O_5$ (M=Li, K, Zn, etc. and x is a variable parameter corresponding to solid solution).

Figure 10:
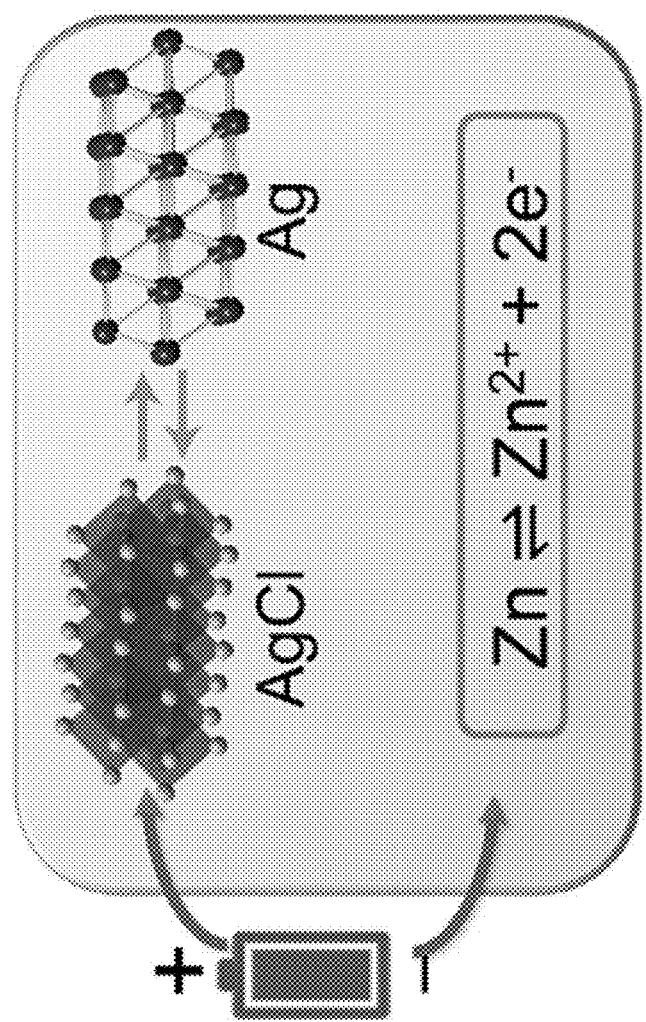
FIG. 10 is a schematic diagram illustrating the reactions in a mild Ag—Zn battery in accordance with one example embodiment of the present invention.

Based on the above, it is appreciated that avoiding intermediate phases of electrode materials during electrode reactions may be essential to realize a flat or substantially flat voltage plateau. As shown in FIG. 10, the Ag electrode of the mild Ag—Zn battery underwent a reversible phase transition process by first oxidized into an insulating (i.e. water-insoluble) AgCl phase and then reduced back to the initial metallic Ag phase; whereas the Zn anode proceeds a reversible deposition-dissolution.

Figure 11:
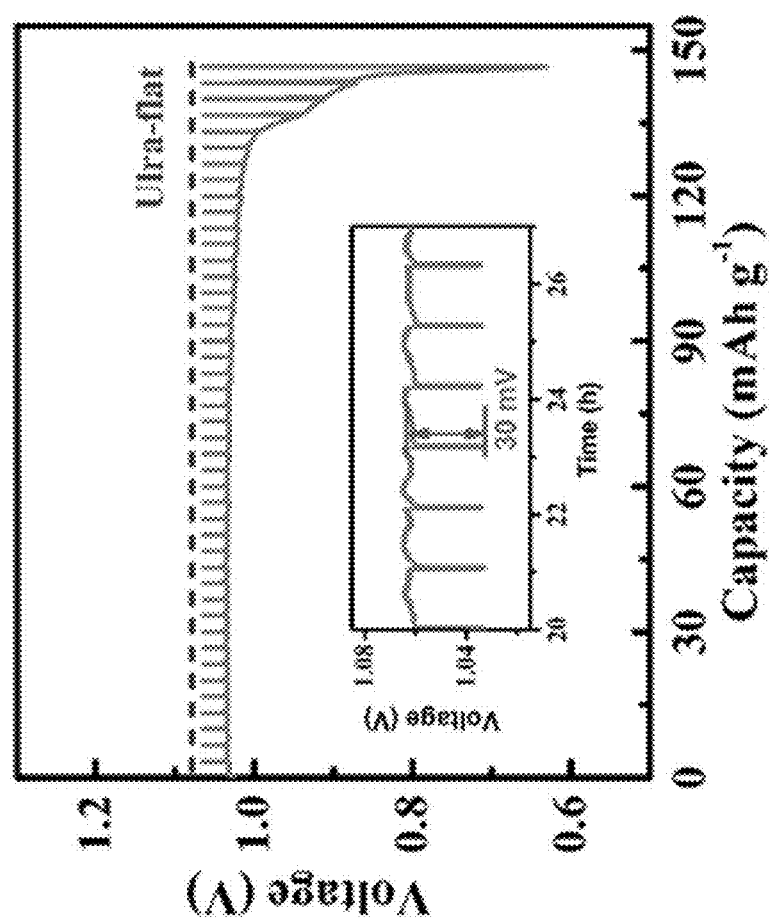
FIG. 11 is a plot of voltage against capacity showing the GITT analysis of the discharging behaviour of the battery of FIG. 10. The insert is a plot of voltage against time showing an overvoltage jump.

In order to verify the conversion between Ag and AgCl is a two-phase transition as well as whether such transition causes a ultra-flat discharge plateau, discharge galvanostatic intermittent titration technique (GITT) profiles of the Ag—Zn battery are studied. As shown in FIG. 11, there was an overvoltage jump of 30 mV, which may be due to the ohm and charge transfer resistances. The equilibrium voltage was found to be almost constant, indicating a negligible dependence of cathode potential. It is concordant with the electrochemical behavior based on the two-phase transition between the metal Ag and the insulating AgCl rather than a solid-solution segregation. It was found that the flat discharging voltage plateau was in a deviation difference within 2% from a fixed voltage value at 1.03 V, where such flat discharging voltage region contributes 90.3% of the total capacity. On the contrary, the relatively sloped voltage profile, which may be due to the size effect of the AgCl cathode, may contribute to the remaining capacity of the battery.

The two-phase transition of Ag (111) and AgCl (110) fractions as a function of state of discharge (SOD) have been compared and determined by XRD analysis. The fractions are in accordance with the relative peak intensity of Ag and AgCl at different discharge states as shown in FIG. 12A. The discharging process was initiated from a full-charged state and discharge to a full-discharged state. In particular, the Ag—Zn battery may have some characteristics of lithium-ion batteries. For example, some Ag and AgCl peaks may still remain after a full charging and discharging cycle at a significantly small current density (e.g. 0.05 A $g^{-1}$), which may be due to the presence of unreacted Ag or AgCl during the transition.

Turning to the intensity variation of Ag (111) peaks and the AgCl (111) peaks with respect to different SODs, both the mole ratios of the Ag and AgCl were found to be linearly correlated to the SODs, which is in accordance with the ideal two-phase model for a flat discharging voltage plateau (FIG. 12B).

Figure 13B:
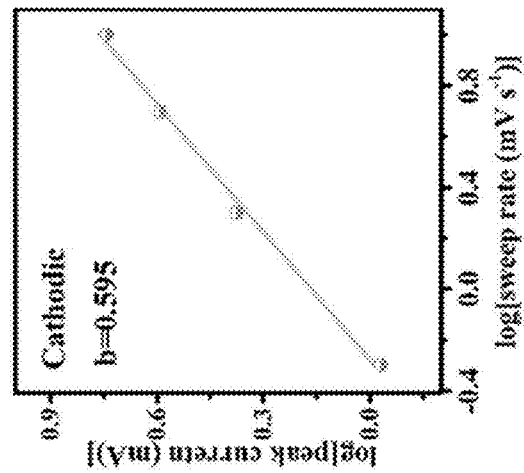
FIG. 13B is a plot of log[peak current] against log[sweep rate] corresponding to FIG. 13A for determining the b value of the battery of FIG. 10.
Figure 13A:
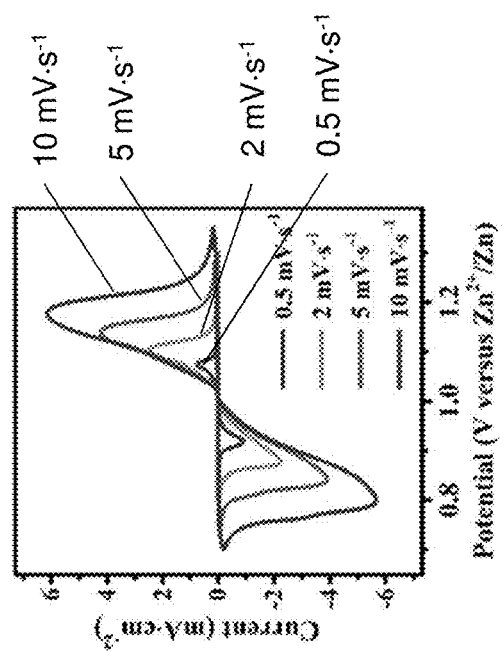
FIG. 13A is a cyclic voltammogram showing the CV curves of the battery of FIG. 10 at different scan rates.

The electrochemical performance of the AgNWs-Zn battery has been studied. As shown in FIG. 13A, only one pair of symmetric redox peaks were observed for each of the scan rates, which correspond to the chloride insertion and extraction behavior during the cyclic operation. With reference to the CV profile of FIG. 13A, the peak response (I), can be correlated to the scan rate (v) through the equation $I=av^b$, where a is a constant and b is the coefficient determining the electrochemical kinetics as diffusion or non-diffusion dominated. In particular, when the b value is close to 0.5, it relates to the battery-type behavior; whereas when the b value is close to 1, it exhibits the capacitor-type behavior on the surface. In instant case, the mild AgNWs-Zn battery was determined to have a b value of 0.595, which is close to 0.5 and therefore it is suggested that there is a strong battery insertion behavior of chloride (FIG. 13B).

Figure 13C:
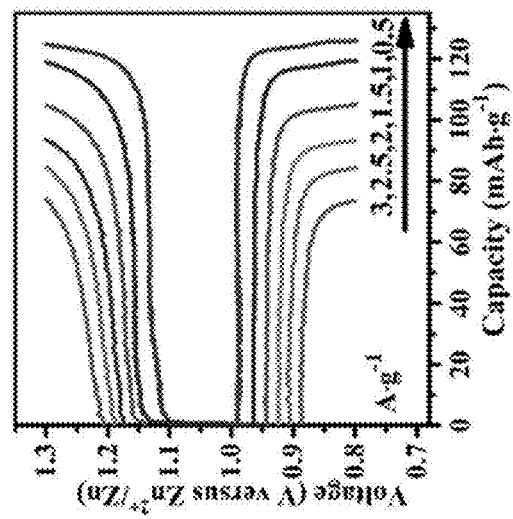
FIG. 13C is a plot of voltage against capacity showing the charging and discharging curves of the battery of FIG. 10 at different current densities.
Figure 14:
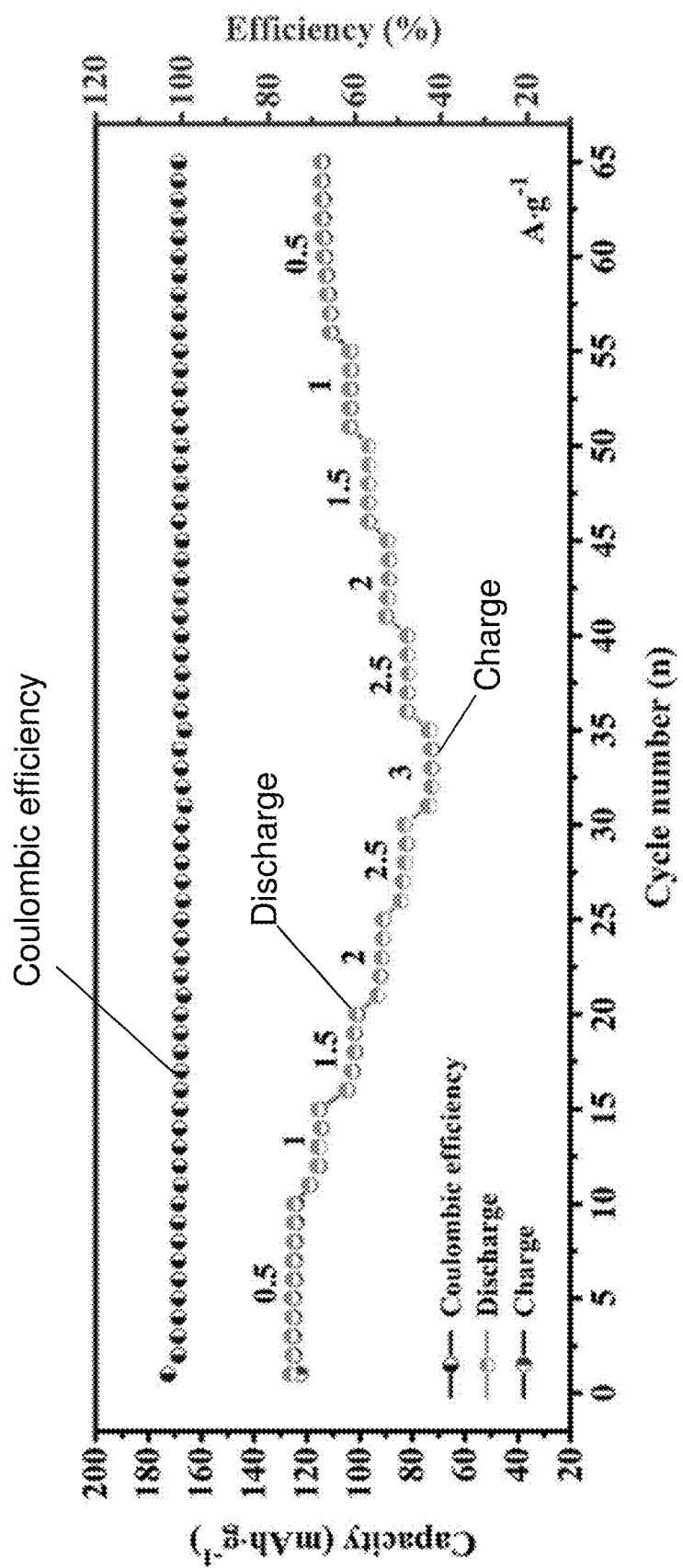
FIG. 14 is a plot showing the rate performance of the battery of FIG. 10.
Figure 15:
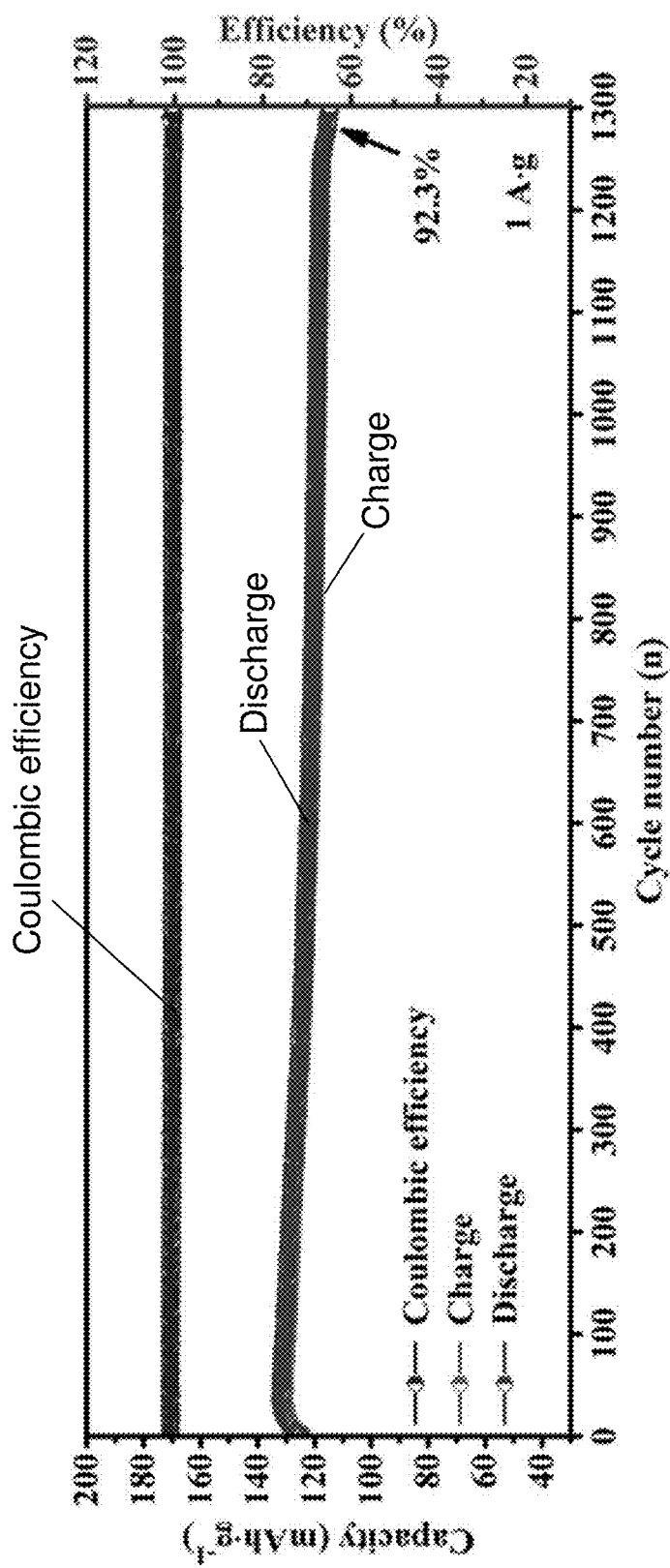
FIG. 15 is a plot showing the cyclic performance of the battery of FIG. 10.

In addition, the discharging plateau of the battery remained ultra-flat even subjecting to different discharging current densities (at a range from 0.5 to 3 A $g^{-1}$) (FIG. 13C). Particularly, the rate capacity is superb that the specific capacity was found to be 81 mAh $g^{-1}$ at 3 A $g^{-1}$ (FIG. 14). The battery also delivered a maximum energy density of 124 Wh $kg^{-1}$ as well as a power density of 2902 W $kg^{-1}$. In long-term cycling evaluation, the battery retained 93.2% capacity after 1300 cycles at 1 A $g^{-1}$, which is unprecedently stable as compared with other reported Ag—Zn batteries (FIGS. 4 and 15). Notably, the Coulombic efficiency (CE) remained stable at almost 100% throughout the cycling, implying a complete conversion between the metallic Ag and the insulating AgCl. Furthermore, the discharge voltage plateaus at randomly selected cycles, such as 50, 200, 600, and 1200 cycles, were found to be substantially flat and overlapping with each other. These results suggest that the AgNWs-Zn battery is capable of delivering an ultra-flat plateau even subjecting to a long-term cycling operation.

The energy storage apparatus of the present invention such as the aforementioned Ag—Zn battery is advantageous since it possesses excellent electrochemical properties. For example, the battery has a high capacity retention of 93.2% at 1 A $g^{-1}$ even being subjected to 1300 cycles. The battery also has a power density of 2902 W $kg^{-1}$ and energy density of 124 Wh $kg^{-1}$, which may be ascribed to the ultra-flat discharging voltage plateau. All these features indicate the potential use of the battery in meeting the demanding power supply and long-term charging/discharging requirements in multifunctional electronics and electric vehicles. Furthermore, the use of a mild electrolyte is considered to have much less safety and health concerns as compared with the corrosive alkaline electrolytes.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An energy storage apparatus, comprising:
    a zinc anode and a silver cathode;
    an electrolyte comprising a zinc chloride electrolytic solution disposed between the anode and the cathode;
    wherein the silver cathode comprises a substantially water-insoluble silver chloride material structure caused by accommodation of chloride ions of the zinc chloride in a silver material structure of the silver cathode and a phase transition thereof; and
    wherein the energy storage apparatus provides a substantially flat discharging voltage plateau at about 1 V caused by the phase transition, thereby providing a stable power output.

2. The energy storage apparatus according to claim 1, comprising from about 0.1 M to about 1 M zinc chloride.

3. The energy storage apparatus according to claim 1, wherein the zinc anode comprises a porous structure with a smooth surface caused by insertion of chloride ions of the zinc chloride into a zinc material structure of the zinc anode and formation of zinc chloride.

4. The energy storage apparatus according to claim 1, wherein the energy storage apparatus provides a cyclic lifetime of at least about 1000 cycles.

5. The energy storage apparatus according to claim 1, wherein the energy storage apparatus is a rechargeable battery.

6. The energy storage apparatus according to claim 1, wherein the silver cathode comprises a silver nanowire cathode.

7. The energy storage apparatus according to claim 6, wherein the silver nanowire cathode has a diameter of about 20 nm.

8. The energy storage apparatus according to claim 6, wherein the silver nanowire has a length of about 50 μm.

9. The energy storage apparatus according to claim 1, wherein the silver material structure comprises a FCC structure.

10. The energy storage apparatus according to claim 1, wherein the silver chloride material structure comprises a FCC structure.

11. A rechargeable battery, comprising:
    an electrolyte comprising a zinc chloride electrolytic solution in electrical communication with a zinc anode and a silver nanowire cathode;
    wherein the silver nanowire cathode comprises a substantially water-insoluble silver chloride material structure caused by accommodation of chloride ions of the zinc chloride in a silver material structure of the silver nanowire cathode and a phase transition thereof;
    the zinc anode comprises a porous structure with a smooth surface caused by the insertion of chloride ions of the zinc chloride into a zinc material structure of the zinc anode and formation of zinc chloride; and
    wherein the rechargeable battery provides a substantially flat discharging voltage plateau at about 1 V and a cyclic lifetime of least about 1000 cycles caused by the phase transition and the formation of zinc chloride.

12. The rechargeable battery according to claim 11, wherein the concentration of the zinc chloride is about 0.1 M to about 1 M.

* * * * *